US009338068B2

(12) United States Patent
Patel et al.

(10) Patent No.: US 9,338,068 B2
(45) Date of Patent: *May 10, 2016

(54) EFFICIENT NETWORK BANDWIDTH UTILIZATION IN A DISTRIBUTED PROCESSING SYSTEM

(71) Applicant: LENOVO ENTERPRISE SOLUTIONS (SINGAPORE) PTE. LTD., Singapore (SG)

(72) Inventors: Keyur Patel, Poughkeepsie, NY (US); SathyaKumar A. Ramalingam, Zumbrota, MN (US); Robert A. Vrabel, Apex, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 126 days.

This patent is subject to a terminal disclaimer.

(21) Appl. No.: 13/708,508

(22) Filed: Dec. 7, 2012

(65) Prior Publication Data

US 2014/0136687 A1 May 15, 2014

Related U.S. Application Data

(63) Continuation of application No. 13/673,428, filed on Nov. 9, 2012.

(51) Int. Cl.
*G06F 15/173* (2006.01)
*H04L 12/26* (2006.01)
(Continued)

(52) U.S. Cl.
CPC .............. *H04L 43/04* (2013.01); *H04L 41/147* (2013.01); *H04L 43/0876* (2013.01); *G06F 11/3055* (2013.01)

(58) Field of Classification Search
USPC .................................. 709/224, 201; 707/758
See application file for complete search history.

(56) References Cited

U.S. PATENT DOCUMENTS 7,280,988 B2 * 10/2007 Helsper et al. .................. 706/26
7,487,105 B2 * 2/2009 Jacobs et al. ................. 705/7.19
7,602,808 B2 * 10/2009 Ullmann et al. .............. 370/468
(Continued)

OTHER PUBLICATIONS

Anderson et al. "Use of Data Mining in Scheduler Optimization", Cornell University Library, arxiv.org (online), Nov. 8, 2010 [accessed Jun. 19, 2012], 10 pp., URL: http://arvix.org/ftp/arxiv/papers/1011/1011.1735.pdf.

(Continued)

*Primary Examiner* — Joseph E Avellino
*Assistant Examiner* — Rachel J Hackenberg
(74) *Attorney, Agent, or Firm* — Edward J. Lenart; Katherine S. Brown; Kennedy Lenart Spraggins LLP

(57) ABSTRACT

Methods, apparatuses, and computer program product for of efficient network bandwidth utilization in a distributed processing system are provided. Embodiments include monitoring, by a network monitor, network usage of a distributed processing system containing a plurality of endpoint devices; creating, by the network monitor, a historical network usage pattern based on the monitoring of the network usage; based on the historical network usage pattern, identifying, by the network monitor, a first set of future time periods predicted to correspond with low network usage; and selecting from the first set of future time periods, by the network monitor, a particular time period to perform a network administrative task on an endpoint device in the distributed processing system.

4 Claims, 4 Drawing Sheets

(51) Int. Cl.
    *H04L 12/24*     (2006.01)
    *G06F 11/30*     (2006.01)

(56) References Cited

U.S. PATENT DOCUMENTS

| | | | |
|---|---|---|---|
| 7,689,521 B2 | 3/2010 | Nodelman et al. | |
| 7,873,505 B2 | 1/2011 | Bauer et al. | |
| 7,926,057 B2 | 4/2011 | Chan et al. | |
| 8,316,127 B2* | 11/2012 | Dahl | 709/224 |
| 8,499,066 B1* | 7/2013 | Zhang et al. | 709/223 |
| 8,505,022 B2* | 8/2013 | Helander | 718/104 |
| 2006/0025123 A1* | 2/2006 | Majmundar et al. | 455/419 |
| 2006/0190938 A1 | 8/2006 | Capek et al. | |
| 2007/0043831 A1* | 2/2007 | Kessler et al. | 709/219 |
| 2008/0273591 A1 | 11/2008 | Brooks et al. | |
| 2008/0288584 A1* | 11/2008 | Colantuono et al. | 709/203 |
| 2009/0288031 A1* | 11/2009 | Solaro et al. | 715/772 |
| 2010/0115048 A1* | 5/2010 | Scahill | 709/213 |
| 2012/0259977 A1* | 10/2012 | Gerovac et al. | 709/224 |
| 2013/0205016 A1* | 8/2013 | Dupre et al. | 709/224 |

OTHER PUBLICATIONS

Yang et al. "A Network Bandwidth-Aware Job Scheduling With Dynamic Information Model for Grid Resource Brokers", 2008 IEEE Asia-Pacific Services Computing Conference, IEEE.org (online), Dec. 2008 [accessed Jun. 19, 2012], pp. 775-780, URL: http://ieeexplore.ieee.org/xpl/login.jsp?tp=&arnumber=4780769&tag=1&url=http%3A%2F%2Fieeexplore.ieee.org%2Fxpls%2Fabs_all.jsp%3Farnumber%3D4780769%26tag%3D1.

Clifton, "Data Mining", Britannica Online Encyclopedia, britannica.com (online), Jun. 19, 2012, 3 pp., URL: http://www.britannica.com/EBchecked/topic/1056150/data-mining/281965/Pattern-mining.

Altuger et al. "Multi Criteria Preventive Maintenance Scheduling Through Arena Based Simulation Modeling", Proceedings of the 2009 Winter Simulation Conference, Winter Simulation Conference Archive, http://www.informs-sim.org (online), winter 2009 [accessed Jun. 19, 2012], pp. 2123-2134, URL: http://www.informs-sim.org/wsc09papers/204.pdf.

* cited by examiner

`US 9,338,068 B2`

EFFICIENT NETWORK BANDWIDTH UTILIZATION IN A DISTRIBUTED PROCESSING SYSTEM

CROSS-REFERENCE TO RELATED APPLICATION

This application is a continuation application of and claims priority from U.S. patent application Ser. No. 13/673,428, filed on Nov. 9, 2012.

BACKGROUND OF THE INVENTION

1. Field of the Invention

The field of the invention is data processing, or, more specifically, methods, apparatuses, and computer program products for efficient network bandwidth utilization in a distributed processing system.

2. Description of Related Art

A network administrator is often tasked with maintaining the health and integrity of a distributed processing system and its associated network and endpoints. Network administrators may rely on a variety of system management tools to help automate and perform tasks such as, performing health checks for the entire network, collecting inventory of endpoint devices of the network, and delivering and managing updates to systems across an enterprise utilizing the network. In a system with hundreds or even thousands of endpoints, managing execution of these tasks and determining when to perform the tasks may be a time consuming and complex task in and of itself for the network administrator.

SUMMARY OF THE INVENTION

Methods, apparatuses, and computer program product for efficient network bandwidth utilization in a distributed processing system are provided. Embodiments include monitoring, by a network monitor, network usage of a distributed processing system containing a plurality of endpoint devices; creating, by the network monitor, a historical network usage pattern based on the monitoring of the network usage; based on the historical network usage pattern, identifying, by the network monitor, a first set of future time periods predicted to correspond with low network usage; and selecting from the first set of future time periods, by the network monitor, a particular time period to perform a network administrative task on an endpoint device in the distributed processing system.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
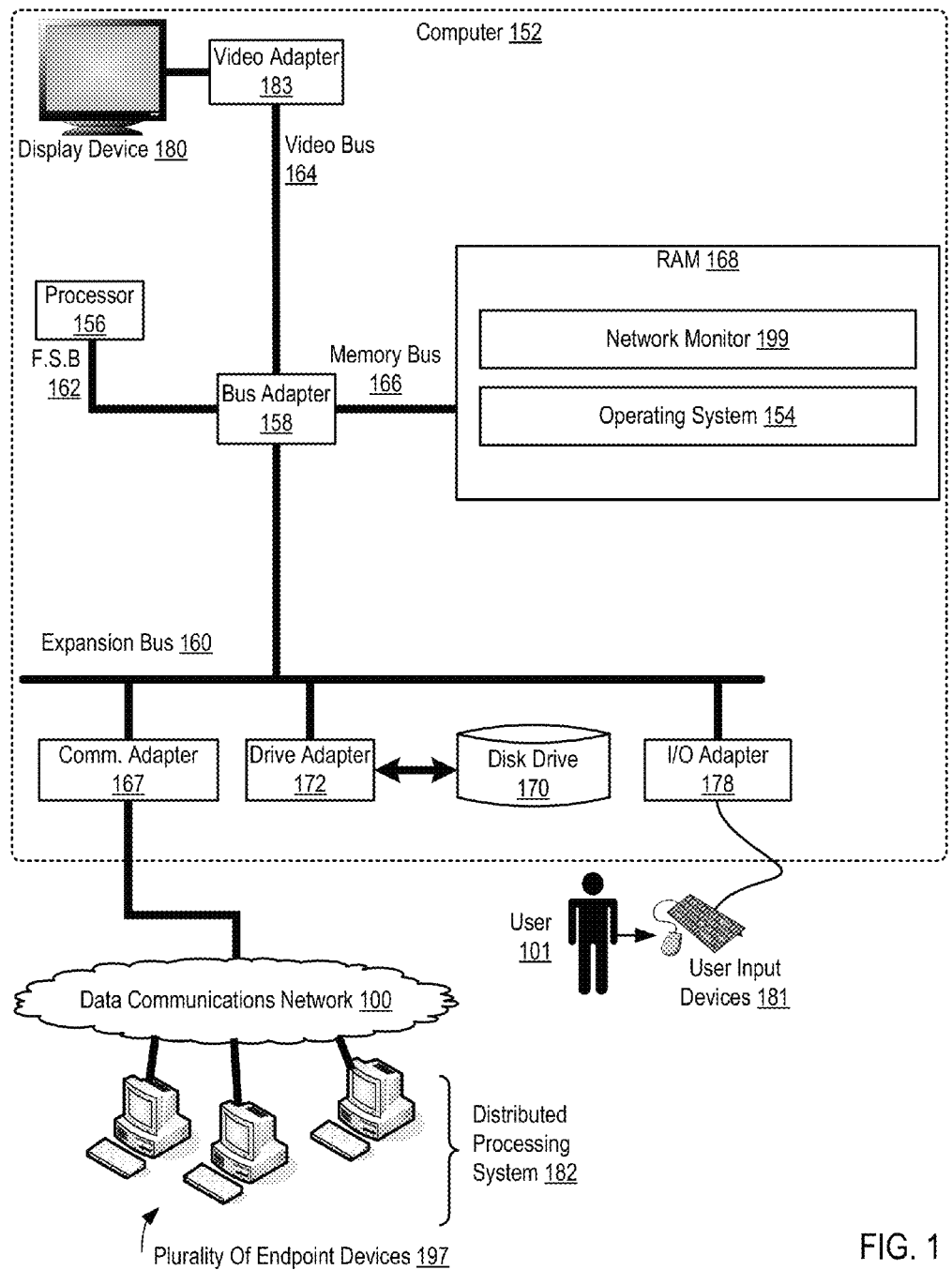
FIG. 1 sets forth a block diagram of automated computing machinery comprising an exemplary computer useful in efficient network bandwidth utilization in a distributed processing system according to embodiments of the present invention.

Exemplary methods, apparatuses, and computer program products for efficient network bandwidth utilization in a distributed processing system in accordance with the present invention are described with reference to the accompanying drawings, beginning with FIG. 1. Efficient network bandwidth utilization in a distributed processing system in accordance with the present invention is generally implemented with computers, that is, with automated computing machinery. FIG. 1 sets forth a block diagram of automated computing machinery comprising an exemplary computer (152) useful in efficient network bandwidth utilization in a distributed processing system according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a network monitor (199) that includes computer program instructions improved for efficient network bandwidth utilization in a distributed processing system according to embodiments of the present invention. Specifically, the network monitor (199) includes computer program instructions that when executed by the computer processor (156) cause the network monitor to carry out the steps of monitoring, by a network monitor, network usage of a distributed processing system containing a plurality of endpoint devices; creating, by the network monitor, a historical network usage pattern based on the monitoring of the network usage; based on the historical network usage pattern, identifying, by the network monitor, a first set of future time periods predicted to correspond with low network usage; and selecting from the first set of future time periods, by the network monitor, a particular time period to perform a network administrative task on an endpoint device in the distributed processing system.

Also stored in RAM (168) is an operating system (154). Operating systems useful efficient network bandwidth utilization in a distributed processing system according to embodiments of the present invention include UNIX™, Linux™, Microsoft XP™, AIX™, IBM's i5/OS™, and others as will occur to those of skill in the art. The operating system (154) and the network monitor (199) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for efficient network bandwidth utilization in a distributed processing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

The exemplary computer (152) of FIG. 1 includes a communications adapter (167) for data communications with a plurality of endpoint devices (197) of a distributed processing system (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for efficient network bandwidth utilization in a distributed processing system according to embodiments of the present invention include modems for wired dial-up communications, Ethernet (IEEE 802.3) adapters for wired data communications network communications, and 802.11 adapters for wireless data communications network communications.

Figure 2:
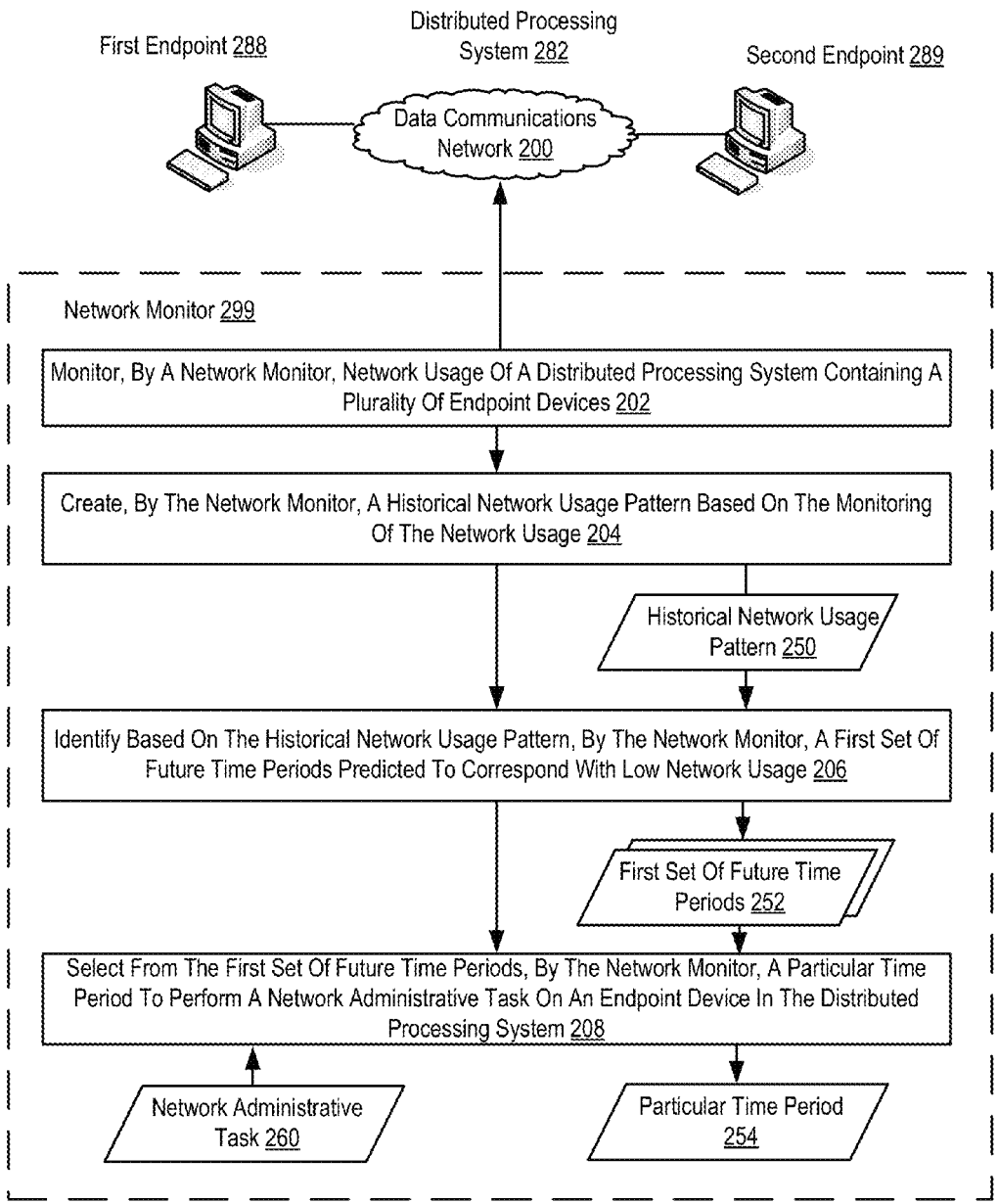
FIG. 2 sets forth a flow chart illustrating an exemplary method for efficient network bandwidth utilization in a distributed processing system according to embodiments of the present invention.

For further explanation, FIG. 2 sets forth a flow chart illustrating an exemplary method for efficient network bandwidth utilization in a distributed processing system according to embodiments of the present invention. The method of FIG. 2 includes monitoring (202), by a network monitor (299), network usage of a distributed processing system (282) containing a plurality of endpoint devices (288, 289). Network usage may be associated with indications of transmission of data over one or more communication links and devices of a network or some indications of utilization of network resources. Monitoring (202), by a network monitor (299), network usage of a distributed processing system (282) containing a plurality of endpoint devices (288, 289) may be carried out by calculating bandwidth utilization of a network at one or more locations of the network during different time periods; and storing usage data indicating calculated bandwidth utilization at specific time periods.

The method of FIG. 2 also includes creating (204), by the network monitor (299), a historical network usage pattern (250) based on the monitoring of the network usage. Creating (204), by the network monitor (299), a historical network usage pattern (250) based on the monitoring of the network usage may be carried out by analyzing usage data; grouping past time periods based on calculated bandwidth utilization; and classifying the groupings to indicate various levels of bandwidth utilization.

The method of FIG. 2 also includes identifying (206) based on the historical network usage pattern (250), by the network monitor (299), a first set (252) of future time periods predicted to correspond with low network usage. Identifying (206) based on the historical network usage pattern (250), by the network monitor (299), a first set (252) of future time periods predicted to correspond with low network usage may be carried out by searching for patterns that differentiate grouping of past time periods; using the classification of the groups to develop patterns and classifications indicating future periods as corresponding to a particular level of bandwidth utilization.

The method of FIG. 2 also includes selecting (208) from the first set (252) of future time periods, by the network monitor (299), a particular time period (254) to perform a network administrative task (260) on an endpoint device (289) in the distributed processing system (282). Examples of a network administrative task include but are not limited to downloading a software module to an endpoint via the network; powering down one or more devices associated with the network; and collecting inventory on an endpoint. Selecting (208) from the first set (252) of future time periods, by the network monitor (299), a particular time period (254) to perform a network administrative task (260) on an endpoint device (289) in the distributed processing system (282) may be carried out by identifying the endpoint associated with the network administrative task; identifying classification of network administrative task; matching the classification of the network administrative task with a particular time period to perform the task.

For example, the network monitor may use the network usage pattern to identify a time period to perform a network administrative task, such as downloading a software update to an endpoint. In this example, the network monitor may determine that the time period of three a.m. to four a.m. is a period predicated to correspond with low network usage. The network monitor may also utilize calendar information to understand and predict more complex scenarios. For example, the network monitor may monitor and predict high network usage during the last few days of a month or during last week of each quarter for a financial institution that is utilizing the network. As another example, software and educational institutions may have low network usage during holidays.

Figure 3:
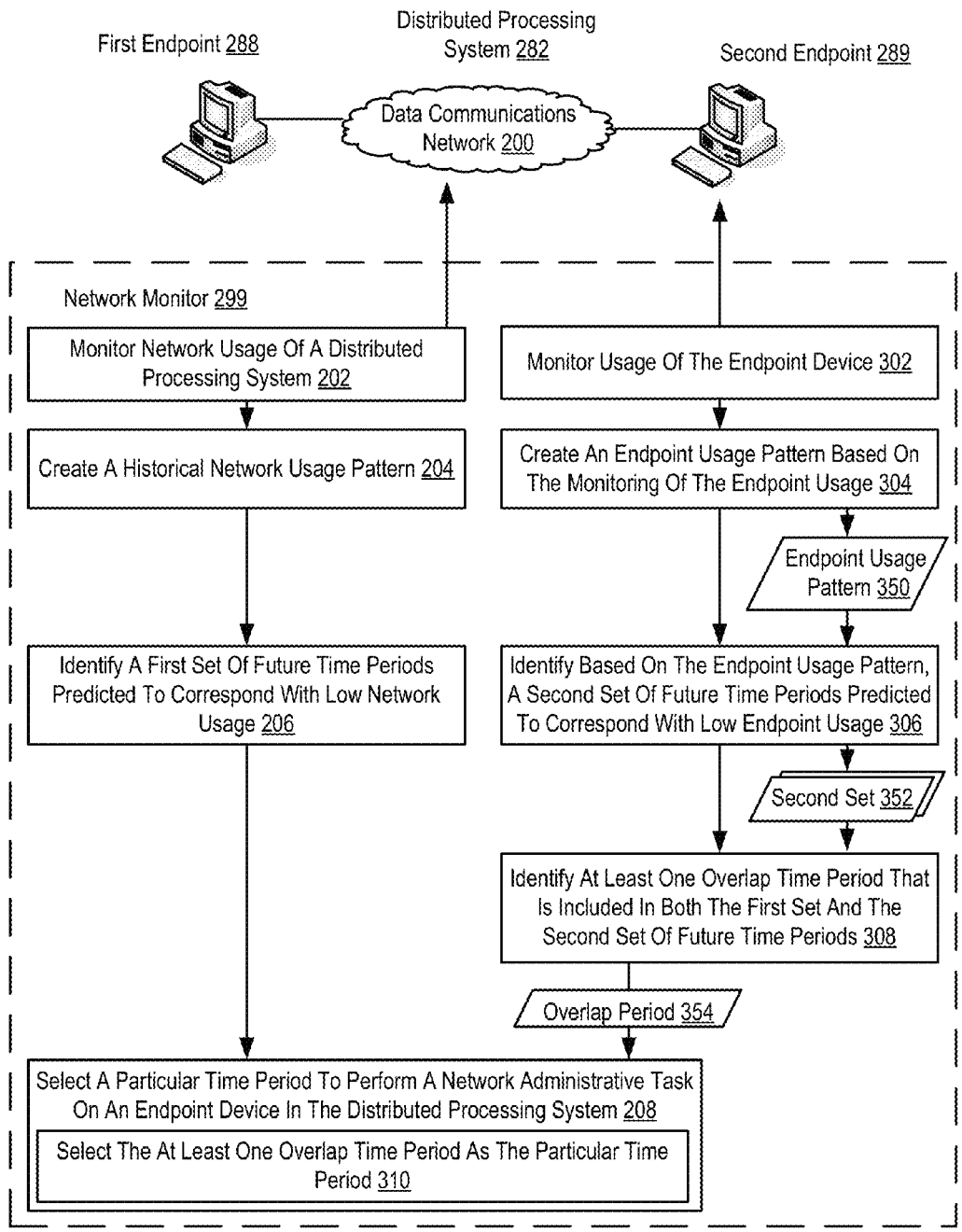
FIG. 3 sets forth a flow chart illustrating a further exemplary method for efficient network bandwidth utilization in a distributed processing system according to embodiments of the present invention.

For further explanation, FIG. 3 sets forth a flow chart illustrating a further exemplary method for efficient network bandwidth utilization in a distributed processing system according to embodiments of the present invention. The method of FIG. 3 is similar to the method of FIG. 2 in that the method of FIG. 3 includes monitoring (202) network usage of a distributed processing system (282) containing a plurality of endpoint devices (288, 289); creating (204) a historical network usage pattern (250) based on the monitoring of the network usage; identifying (206) based on the historical network usage pattern (250), by the network monitor (299), a first set (252) of future time periods predicted to correspond with low network usage; selecting (208) from the first set (252) of future time periods, a particular time period (254) to perform a network administrative task (260) on an endpoint device (289) in the distributed processing system (282).

The method of FIG. 3 includes monitoring (302), by the network monitor (299), usage of the endpoint device (289). Monitoring (302), by the network monitor (299), usage of the endpoint device (289) may be carried out by calculating bandwidth utilization of endpoints during different time periods; and storing usage data indicating calculated utilization of those endpoints at specific time periods. Monitoring (302), by the network monitor (299), usage of the endpoint device (289) may be carried out by monitoring time periods that a user of the endpoint is logged in to the system.

The method of FIG. 3 includes creating (304), by the network monitor (299), an endpoint usage pattern (350) based on the monitoring of the endpoint usage (289). Creating (304) an endpoint usage pattern (350) based on the monitoring of the endpoint usage (289) may be carried out by analyzing usage data; grouping past time periods based on calculated utilization; and classifying the groupings to indicate various levels of bandwidth utilization. Additional factors, such as typical user log-in times may also be considered in creating the endpoint usage pattern.

The method of FIG. 3 also includes identifying (306) based on the endpoint usage pattern (350), by the network monitor (299), a second set (352) of future time periods predicted to correspond with low endpoint usage. Identifying (306) based on the endpoint usage pattern (350), by the network monitor (299), a second set (352) of future time periods predicted to correspond with low endpoint usage may be carried out by searching for patterns that differentiate grouping of past time periods; using the classifications of the groups to develop patterns and classifications indicating future periods as corresponding to a particular level of utilization.

The method of FIG. 3 includes identifying (308), by the network monitor (299), at least one overlap time period (354) that is included in both the first set (252) and the second set (352) of future time periods. Identifying (308) at least one overlap time period (354) that is included in both the first set (252) and the second set (352) of future time periods may be carried out by matching time periods in both the first and the second set of future time periods.

In the method of FIG. 3, selecting (208) from the first set (252) of future time periods, a particular time period (254) to perform a network administrative task (260) on an endpoint device (289) in the distributed processing system (282) includes selecting (310) the at least one overlap time period (354) as the particular time period (254). Selecting (310) the at least one overlap time period (354) as the particular time period (254) may be carried out by designating one of the overlap time periods as the particular time period.

Figure 4:
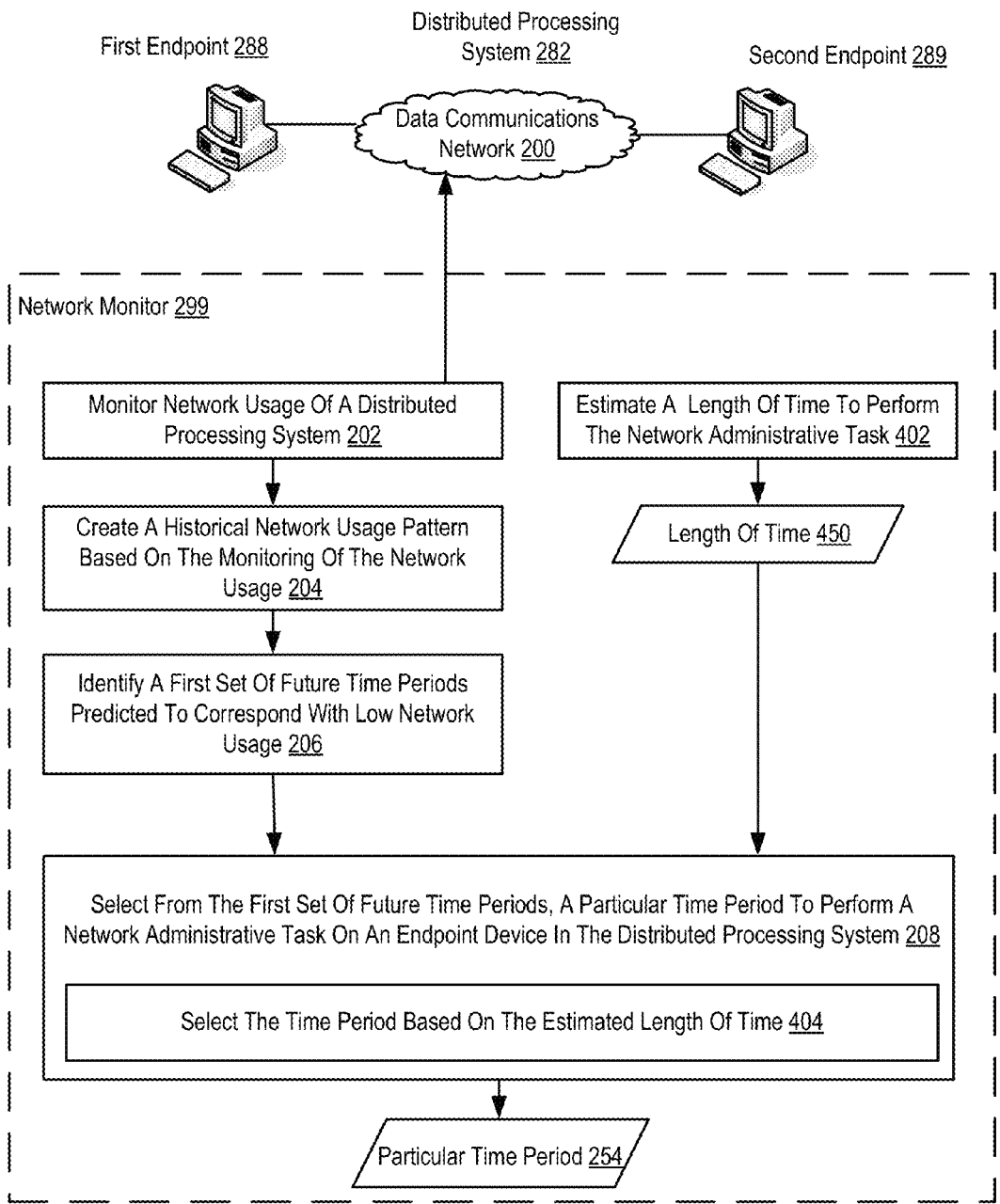
FIG. 4 sets forth a flow chart illustrating a further exemplary method for efficient network bandwidth utilization in a distributed processing system according to embodiments of the present invention.

For further explanation, FIG. 4 sets forth a flow chart illustrating a further exemplary method for efficient network bandwidth utilization in a distributed processing system according to embodiments of the present invention. The method of FIG. 4 is similar to the method of FIG. 2 in that the method of FIG. 4 includes monitoring (202) network usage of a distributed processing system (282) containing a plurality of endpoint devices (288, 289); creating (204) a historical network usage pattern (250) based on the monitoring of the network usage; identifying (206) based on the historical network usage pattern (250), by the network monitor (299), a first set (252) of future time periods predicted to correspond with low network usage; selecting (208) from the first set (252) of future time periods, a particular time period (254) to perform a network administrative task (260) on an endpoint device (289) in the distributed processing system (282).

The method of FIG. 4 includes estimating (402) a length (450) of time to perform the network administrative task (260). Estimating (402) a length (450) of time to perform the network administrative task (260) may be carried out by using meta data associated with the network administrative task to determine an estimate of execution time to perform the network administrative task.

In the method of FIG. 4, selecting (208) from the first set (252) of future time periods, a particular time period (254) to perform a network administrative task (260) on an endpoint device (289) in the distributed processing system (282) includes selecting (404) the particular time period (254) based on the estimated length (450) of time. Selecting (404) the particular time period (254) based on the estimated length (450) of time may be carried out by comparing the estimate to available time periods; and identifying a time period that is long enough to include the estimated length of time to perform execution of the network administrative task.

Exemplary embodiments of the present invention are described largely in the context of a fully functional computer system for efficient network bandwidth utilization in a distributed processing system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
    tracking bandwidth utilization on a network;
    based on tracked bandwidth utilization, identifying a first set of future time periods during which future bandwidth utilization of said network, by a plurality of endpoint devices, is predicted to be below a predetermined threshold, wherein identifying the first set of future time periods comprises:
    developing network usage patterns and classifications indicating future periods as corresponding to a particular level of bandwidth utilization;
    monitoring endpoint usage of one of the plurality of endpoint devices;
    creating an endpoint usage pattern based on the monitoring of the endpoint usage;
    based on the endpoint usage pattern, identifying a second set of future time periods predicted to correspond with endpoint usage below a predetermined endpoint usage threshold;
    identifying at least one overlap time period that is included in both the first set and the second set of future time periods, wherein identifying the at least one overlap time period comprises matching at least one of the first set of future time periods wherein bandwidth utilization is predicted to be below the predetermined threshold and at least one of the second set of future time periods wherein endpoint usage is predicted to be below the predetermined endpoint usage threshold;
    selecting, from the first set of future time periods, a particular time period to perform a network administrative task on an endpoint device of said plurality of endpoint devices, wherein selecting from the first set of future time periods, the particular time period to perform the network administrative task includes selecting the at least one overlap time period as the particular time period; and
    performing the network administrative task during the selected particular time period.

2. The method of claim 1 further comprising estimating a length of time to perform the network administrative task; and
    wherein selecting from the first set of future time periods, the particular time period to perform the network administrative task includes selecting the particular time period based on the estimated length of time.

3. The method of claim 1 wherein performance of the administrative task includes downloading a software module to the endpoint via the network.

4. The method of claim 1 wherein the network administrative task includes powering down one or more devices associated with the network.

\* \* \* \* \*